United States Patent
Konabe et al.

(10) Patent No.: US 7,624,514 B2
(45) Date of Patent: Dec. 1, 2009

(54) DRYING SYSTEM

(75) Inventors: Akihisa Konabe, Shizuoka (JP); Isao Kurobe, Shizuoka (JP)

(73) Assignee: Green Seiju Co., Ltd., Shizuoka-Shi (JP)

( * ) Notice: Subject to any disclaimer, the term of this patent is extended or adjusted under 35 U.S.C. 154(b) by 72 days.

(21) Appl. No.: 10/548,953

(22) PCT Filed: Mar. 16, 2004

(86) PCT No.: PCT/JP2004/003511

§ 371 (c)(1),
(2), (4) Date: Sep. 15, 2005

(87) PCT Pub. No.: WO2005/001357

PCT Pub. Date: Jan. 6, 2005

(65) Prior Publication Data

US 2006/0225298 A1    Oct. 12, 2006

(30) Foreign Application Priority Data

Mar. 19, 2003 (JP) ............................ 2003-076157
Mar. 15, 2004 (JP) ............................ 2004-072180

(51) Int. Cl.
*F26B 3/00* (2006.01)
(52) U.S. Cl. ................................. 34/86; 34/90; 62/173
(58) Field of Classification Search .................. 34/515, 34/90, 77, 78, 80, 86; 62/173, 178
See application file for complete search history.

(56) References Cited

U.S. PATENT DOCUMENTS 2,643,523 A * 6/1953 Burgess ........................ 62/173
3,064,358 A * 11/1962 Giuffre ......................... 34/569
3,085,012 A * 4/1963 Wayne .......................... 34/287
3,110,544 A * 11/1963 Moulthrop ..................... 8/137
3,113,032 A * 12/1963 Wayne .......................... 34/290
3,122,908 A * 3/1964 Stanulis et al. ............. 68/12.09
3,132,930 A * 5/1964 Abbott et al. .................. 34/92
3,218,728 A * 11/1965 Barth et al. ................... 34/292
3,270,530 A * 9/1966 Czech ......................... 68/18 R
3,290,793 A * 12/1966 Jacobs et al. ................... 34/76
3,364,590 A * 1/1968 Collins .......................... 34/77
3,508,881 A * 4/1970 Hagenauer et al. ............ 422/62
3,694,925 A * 10/1972 Coyle et al. ................... 34/542
3,762,065 A   10/1973 Wahlgren (Continued)

FOREIGN PATENT DOCUMENTS

DE       36 03 317 A1    8/1987

(Continued)

*Primary Examiner*—Stephen M. Gravini
(74) *Attorney, Agent, or Firm*—Oliff & Berridge, PLC

(57) ABSTRACT

In a drying system using a compression refrigeration system, a condenser is divided into a regulating condenser and a heating condenser. The regulating condenser is capable of regulating the amount of exhaust heat discharged to outside the system. The heating condenser produces moist air by feeding heat to an aqueous object to be dried placed in a processing vessel to evaporate the moisture in the object. Heat of condensation of steam is recovered by an evaporator as heat of a refrigerant, and the recovered heat is discharged in the heating condenser to use it for the vaporization of the moisture in the object, and excess heat is discharged by the regulating condenser to outside the system.

14 Claims, 10 Drawing Sheets

U.S. PATENT DOCUMENTS

| | | | |
|---|---|---|---|
| 3,899,108 A * | 8/1975 | Frauendorf | 223/51 |
| 3,922,798 A * | 12/1975 | McMillan | 34/73 |
| 3,978,694 A * | 9/1976 | Hughes et al. | 68/18 R |
| 4,122,611 A | 10/1978 | Marchal et al. | |
| 4,205,456 A * | 6/1980 | Ayers et al. | 34/515 |
| 4,224,039 A * | 9/1980 | Smith et al. | 44/551 |
| 4,250,629 A * | 2/1981 | Lewis | 34/380 |
| RE31,633 E * | 7/1984 | Lewis | 34/381 |
| 4,520,577 A * | 6/1985 | Suissa | 34/76 |
| 4,603,489 A * | 8/1986 | Goldberg | 34/77 |
| 4,621,438 A * | 11/1986 | Lanciaux | 34/77 |
| 4,774,821 A * | 10/1988 | Luppi et al. | 68/18 C |
| 4,800,655 A * | 1/1989 | Mori et al. | 34/77 |
| 5,111,596 A | 5/1992 | Laurenty | |
| 5,119,571 A * | 6/1992 | Beasley | 34/446 |
| 5,168,709 A * | 12/1992 | Bombard | 62/48.1 |
| 5,353,519 A | 10/1994 | Kanamaru et al. | |
| 5,361,511 A * | 11/1994 | Brown | 34/468 |
| 5,456,022 A * | 10/1995 | McLeod et al. | 34/77 |
| 5,554,416 A * | 9/1996 | Scheufler et al. | 427/378 |
| 5,709,038 A * | 1/1998 | Scheufler et al. | 34/475 |
| 5,718,061 A * | 2/1998 | Scheufler et al. | 34/475 |
| 5,768,730 A * | 6/1998 | Matsumoto et al. | 8/159 |
| 5,882,381 A * | 3/1999 | Hauck et al. | 95/109 |
| 5,970,625 A * | 10/1999 | Scheufler et al. | 34/477 |
| 6,035,551 A * | 3/2000 | Scheufler et al. | 34/475 |
| 6,151,795 A * | 11/2000 | Hoffman | 34/92 |
| 6,203,859 B1 * | 3/2001 | Scheufler et al. | 427/475 |
| 6,295,825 B1 * | 10/2001 | Jin | 62/238.7 |
| 6,904,703 B2 * | 6/2005 | Naganawa et al. | 34/596 |
| 7,010,363 B2 * | 3/2006 | Donnelly et al. | 700/19 |
| 7,020,985 B2 * | 4/2006 | Casey et al. | 34/595 |
| 7,055,262 B2 * | 6/2006 | Goldberg et al. | 34/86 |
| 7,073,273 B2 * | 7/2006 | Kim | 34/595 |
| 7,191,543 B2 * | 3/2007 | Yakumaru et al. | 34/77 |
| 7,322,123 B2 * | 1/2008 | Tadano et al. | 34/77 |
| 7,325,333 B2 * | 2/2008 | Tadano et al. | 34/604 |
| 7,347,009 B2 * | 3/2008 | Ahn et al. | 34/607 |
| 7,409,776 B2 * | 8/2008 | Ono et al. | 34/77 |
| 7,458,171 B1 * | 12/2008 | Lentz | 34/75 |
| 7,469,486 B2 * | 12/2008 | Tamura et al. | 34/77 |
| 2001/0005525 A1 * | 6/2001 | Scheufler et al. | 427/195 |
| 2002/0029580 A1 * | 3/2002 | Faqih | 62/291 |
| 2002/0046569 A1 * | 4/2002 | Faqih | 62/188 |
| 2003/0051367 A1 * | 3/2003 | Griffin | 34/132 |
| 2003/0115768 A1 * | 6/2003 | Hoffman | 34/92 |
| 2003/0121271 A1 * | 7/2003 | Dinnage et al. | 62/94 |
| 2003/0150226 A1 * | 8/2003 | Jensen | 62/171 |
| 2004/0000069 A1 * | 1/2004 | Gurol | 34/592 |
| 2004/0010937 A1 * | 1/2004 | Naganawa et al. | 34/595 |
| 2004/0255394 A1 * | 12/2004 | Mani et al. | 8/159 |
| 2005/0066538 A1 * | 3/2005 | Goldberg et al. | 34/218 |
| 2005/0086824 A1 * | 4/2005 | Ono et al. | 34/62 |
| 2005/0183208 A1 * | 8/2005 | Scheper et al. | 8/142 |
| 2005/0198852 A1 * | 9/2005 | Ono et al. | 34/77 |
| 2005/0199016 A1 * | 9/2005 | Tadano et al. | 68/18 C |
| 2005/0204583 A1 * | 9/2005 | Kim | 34/604 |
| 2005/0204755 A1 * | 9/2005 | Nishiwaki et al. | 62/93 |
| 2005/0210698 A1 * | 9/2005 | Casey et al. | 34/134 |
| 2005/0210910 A1 * | 9/2005 | Rigney et al. | 62/407 |
| 2005/0217133 A1 * | 10/2005 | Yakumaru et al. | 34/134 |
| 2005/0252229 A1 * | 11/2005 | Moratalla | 62/271 |
| 2005/0262862 A1 * | 12/2005 | Moffitt | 62/271 |
| 2005/0278972 A1 * | 12/2005 | Maruca | 34/201 |
| 2006/0053651 A1 * | 3/2006 | Tadano et al. | 34/74 |
| 2006/0059922 A1 * | 3/2006 | Anderson et al. | 62/93 |
| 2006/0080974 A1 * | 4/2006 | Ono et al. | 62/93 |
| 2006/0117593 A1 * | 6/2006 | Ahn et al. | 34/513 |
| 2006/0179676 A1 * | 8/2006 | Goldberg et al. | 34/77 |
| 2006/0179681 A1 * | 8/2006 | Tamura et al. | 34/475 |
| 2006/0218812 A1 * | 10/2006 | Brown | 34/86 |
| 2006/0225298 A1 * | 10/2006 | Konabe et al. | 34/77 |
| 2006/0288717 A1 * | 12/2006 | Chou | 62/201 |
| 2007/0006601 A1 * | 1/2007 | Thiyagarajan et al. | 62/173 |
| 2007/0017113 A1 * | 1/2007 | Scharpf et al. | 34/86 |
| 2007/0107255 A1 * | 5/2007 | Tamura et al. | 34/475 |
| 2007/0118996 A1 * | 5/2007 | Mills et al. | 8/158 |
| 2007/0130977 A1 * | 6/2007 | Chou | 62/238.6 |
| 2007/0144032 A1 * | 6/2007 | Maruca | 34/469 |
| 2008/0224646 A1 * | 9/2008 | Boyadjieff | 318/622 |
| 2008/0245087 A1 * | 10/2008 | Orcutt | 62/238.7 |
| 2008/0289212 A1 * | 11/2008 | Moon et al. | 34/267 |

FOREIGN PATENT DOCUMENTS

| | | |
|---|---|---|
| DE | 91 00 341.5 U1 | 12/1991 |
| DE | 43 04 226 A1 | 8/1994 |
| EP | 0 356 388 A2 | 2/1990 |
| EP | 0 407 278 A1 | 1/1991 |
| FR | 2 541 760 | 8/1984 |
| JP | A 6-257940 | 9/1994 |
| JP | A 9-33169 | 2/1997 |
| JP | A 10-89843 | 4/1998 |
| JP | A 2000-304449 | 11/2000 |
| JP | A 2001-194064 | 7/2001 |
| JP | A 2001-263941 | 9/2001 |
| JP | A 2001-324269 | 11/2001 |
| WO | WO 86/05575 A1 | 9/1986 |
| WO | WO 89/08229 A1 | 9/1989 |
| WO | WO 93/13842 A1 | 7/1993 |
| WO | WO 94/20804 A1 | 9/1994 |
| WO | WO 01/17702 A1 | 3/2001 |

* cited by examiner

DRYING SYSTEM

FIELD OF THE INVENTION

The present invention relates to a drying system. More particularly, the invention relates to a closed drying system using a compression refrigeration cycle of high energy efficiency to reduce affect on the environment.

DESCRIPTION OF THE PRIOR ART

Sun-drying or air-drying procedures have previously been done. Such procedures can dry with high quality, provided that rotting is prevented. However, it is difficult to do such procedures industrially, since vast amount of grounds and long time is required therefor. Further, such procedures are also depending on weather. Whereas, heating-type drying equipment and hot-wind drying equipment energy must waste great amount of energy, since hot waste gas including water steam must be drained. Furthermore, vacuum drying equipment, as another drying procedure, is still problematic on its operation, operating cost, and the ease of handling thereof.

Japanese Patent Laid-Open Public Disclosure Hei. 11-63818 (1999) (FIG. 1) discloses vacuum drying equipment. Japanese Patent Laid-Open Public Disclosure Hei. 11-197395(1999) (FIG. 1) discloses drying equipment effectively using energy in which water vapor is condensed through an evaporator, and thus obtained low humidity air is reheated (heated again) by a compressor. To their equipment may be added a commercially available, water condenser with reheating properties. In this heating method, heat is transferred to an object to be dried from hot air of low humidity. Therefore, unless the temperature of the object is lower than that of the hot air and the object is contacted with the air sufficiently, the air of warm, light, and low humidity races between the object and the evaporator, thus extremely decreasing water condensing efficiency. In conclusion, although the drying equipment is used preferably for drying clothing or woods, which can forcedly be brought into contact with the air, but not preferably for drying form-variable objects, for example, from paste into powder.

Although it can easily be thought by those skilled in the art to utilize heat energy generated through the compression refrigeration cycle as heat for drying object, no the trials for using such heat energy have been succeeded because of the following problems.

(1) The capacity of the refrigeration cycle can not be used with practical efficiency due to the lack of control mechanism for optimizing the flow rate. The efficiency for condensing water vapor is highly reduced as the water content of the object is lowered and the relative humidity of the circulating air is reduced.

(2) The refrigeration cycle can not be operated constantly or normally, since the heat balance of the system is not controllable. Otherwise, the mechanism required for controlling the heat balance is so complex that it is difficult to produce the mechanism in a practical cost.

(3) Objects can not be assumed with high quality, since the amount of heat energy used for heating the objects are not controllable.

(4) The capacity of the refrigeration cycle can not be used with practical efficiency due to the lack of the means for enhancing the amount of water vaporized in a unit of time. Although there are thought a variety of means for facilitating the evaporation, the practicability can not be achieved unless the evaporation capacity suitable for the refrigeration cycle is provided through either one or all of the evaporation facilitator.

DISCLOSURE OF THE INVENTION

Therefore, the object of the present invention is to provide a new and useful drying system for solving the above mentioned problems by substantially reducing amount of energy to be consumed and preventing discharge waste gas from the system.

The present invention has succeeded to provide a previously impossible drying system for heating the object through the refrigeration cycle by making a variety of countermeasures against the above mentioned problems.

SUMMARY OF THE INVENTION

The first aspect of the invention is a closed drying system of a compression refrigeration cycle section including a compressor, an evaporator, a condenser, and an expansion valve having being connected during a coolant circulating passage, wherein the condenser comprises a heating condenser for supplying heat energy to a moisture-containing object to generate moisture-laden air, which contains the moisture in water vapor removed from the object, by evaporation of the moisture of the object, and a regulating condenser for exhausting waste heat adjustably out of the system, the evaporator is adapted to remove water vapor from the moisture-laden air by refrigeration, and the coolant circulating passage delivers coolant from the compressor through the heating condenser into the regulating condenser.

The second aspect of the invention is the drying system according to claim 1, further comprising; an air-circulator for circulating air between the object and the evaporator, a detector for detecting the humidity and the temperature of the moisture-laden air immediately before flowing over the evaporator, and a flow-rate controller for controlling the flow-rate of the moisture-laden air flowing over the evaporator so as to maximize the amount of water to be condensed on the basis of information obtained by the detector on the humidity and the temperature.

The third aspect of the invention is the drying system according to claim 1 or 2, further comprising; another, second coolant supplying passage for supplying the coolant directly to the regulating condenser, the second passage being arranged in parallel with the coolant supplying passage for supplying the coolant from the compressor to the heating condenser, a flow control valve provided in the second coolant supplying passage, and wherein the expansion valve is disposed just downstream of the regulating condenser.

The fourth aspect of the invention is the drying system according to any one of the preceding claims, further comprising; a heat-amount controller for controlling the amount of heat energy provided by the heating condenser by controlling revolution of the compressor to vary the amount of the coolant to be delivered to the heating condenser.

The fifth aspect of the invention is the drying system according to in any one of the preceding claims, wherein the heat energy is supplied through the bottom of the vessel into the object.

The sixth aspect of the invention is the drying system according to any one of the preceding claims, further comprising; a stirrer for stirring the object, and an assistor for assisting the heat transfer, with being provided substantially separate from the vessel and the stirrer.

The seventh aspect of the invention is the drying system according to any one of the preceding claims, further comprising; a stirrer for stirring and a pulverizer for pulverizing the object, both being provided within the vessel.

The eighth aspect of the invention is the drying system according to any one of the preceding claims, wherein the object to be charged within the vessel includes a water-containing organic material.

The ninth aspect of the invention is the drying system accordingly to any one of the preceding claims, further comprising; a reheater connected directly through the coolant supplying passage to the heating condenser and for reheating the air within the vessel, a detector for detecting the temperature of the coolant within the conduit from the compressor, and a reheat-amount controller for controlling the amount of heat energy provided by the reheating element on the basis of the information obtained by the detector.

The tenth aspect of the invention is the drying system according to any one of the preceding claims, wherein the cooling is effected either through direct cooling mode by flowing the coolant decompressed by the expansion valve into the evaporator, or through indirect refrigeration mode by circulating the first brine between the evaporator and a cooling element provided within the vessel and connected heat exchangeably to the evaporator, and the heating is effected either through direct heating mode by flowing the coolant pressurized by the compressor to the heating condenser provided under the bottom of the vessel to heat the object within the vessel or through indirect heating mode by circulating the second brine between the heating condenser and a heater connected heat exchangeably to the heating condenser and provided under the vessel to heat the object within the vessel.

The $11^{th}$ aspect of the invention is the drying system according to claim 10, wherein the indirect cooling mode and the indirect heating mode are adopted to make it possible to separate the compression refrigeration cycle section of the drying system from the processing section including the vessel.

The $12^{th}$ aspect of the invention is the processing section included in the drying system according to claim 11.

The $13^{th}$ aspect of the invention is the drying system according to claim 10, wherein the direct or indirect cooling mode and the indirect heating mode are adopted, the vessel includes a vessel body and an air-flow passage both ends of which are separately connected with the vessel body, having the evaporator or the cooling element accommodated therein, and the compression refrigeration cycle section and the air-flow passage are assembled separately with the processing section except for the air-flow passage to compose the drying system.

The $14^{th}$ aspect of the invention is the processing section included in the drying system according to claim 13.

In accordance with the drying system of the invention, the amount of energy to be consumed would be highly reduced, since the refrigerating side as well as the heating side of the compression refrigeration cycle can be used at the same time. Especially, when the amount of heat energy delivered out at the regulating condenser is little, the amount of heat energy delivered out from the system may also be inhibited substantially. In the compression refrigeration cycle, the refrigerating capacity of 3 can normally be obtained from the electric input of 1, although it might vary depending on the operating condition of the system. In the heating side forming the heat pump of the system, the heating capacity of 4 (1+3=4) can be obtained. In other words, although the coefficient of performance (COP) of the refrigerating capacity is about 3, the heating capacity obtained in the heating side can be 4. In this connection, the present system using the refrigerating side as well as the heating side at the same time can utilize the refrigeration capacity of 3 and the heating capacity of 4 obtained from the electric input of 1, so that the practical COP of 7 can be achieved. Thus it can be expected a high energy saving effect.

In the case of prior art rapid high temperature, drying systems such as an electric heater or a gas heater, the surface of the object is hardened or charred, whereas water still remains within the object, and often the ingredient of the object such as proteins or glucide are affected by heat. On the other hand, the drying system of the invention using the condensing temperature of the refrigeration cycle can operate with keeping the temperature of the object and the interior of the vessel in ordinary temperature (0-60° C.). Thus the problems of charring or so are prevented. When the condensation pressure of the refrigeration cycle is 2.0 MPa, the condensation temperature of 50° C. is available on R 22, and the condensation temperature of 45.6-50.3° C. is available on R 407.

Further, in accordance with the drying system of the invention, if including the circulator, the stirrer, and pulverizer are additionally provided, relatively short time is required for drying the object in ordinary temperature, since the evaporation rate of the system brought into the maximum due the use of circulators.

Additionally, no odor is released from the system. Taking the fact that organic materials often have their particular odors into consideration, the drying system of the invention is especially suitable for organic materials of high water content.

In conclusion, the drying system of the invention is referred to as a good system for environment.

The features recited from aspect 2 to the final aspect will provide more advantageous effects. These advantages will now be described for each aspect.

In the drying system of the second aspect, not only the operating efficiency of the drying system may be enhanced by increasing the total condensation amount, but also obtain an object of lower water content and higher quality by condensing water in the very low temperature near the dew point at the end of the drying operation.

In the drying system of the third aspect, the heat balance of the compression refrigeration cycle can be controlled optimally through the provision of the second coolant supplying passage.

In the drying system of the fourth aspect, the amount of heat energy provided by the heating condenser i.e. the amount of heat energy supplied to the object can be controlled.

In the drying system of the fifth aspect, the heat energy generated by the heating condenser can be efficiently transferred to the object.

In the drying system of the sixth aspect, the heat energy can be transferred to the whole of the object (W) certainly, uniformly, and rapidly by adding the stirrer for stirring and the assister for assisting the heat transfer.

In the drying system of the seventh aspect, the evaporation rate can be increased by utilizing the stirrer in combination with the pulverizer. Thus the compression refrigeration cycle can be utilized efficiently and the object of lower water content and higher quality can be obtained.

In the drying system of the ninth aspect, the water removing efficiency can be enhanced even if the performance of the evaporator is recovered by the reheating element, whereby in the final drying stage, water-removal efficiency is improved.

In the drying system of any one of the $11^{th}$ to $14^{th}$ aspects, the compression refrigeration cycle section can removably be connected to the drying section, so that any commercially available ones can be used as the compression refrigeration cycle section.

BRIEF DESCRIPTION OF THE DRAWINGS

Further feature of the invention will become apparent to those skilled in the art to which the present invention relates from reading the following specification with reference to the accompanying drawings, in which.

DETAILED DESCRIPTION OF THE PRESENT INVENTION

The first embodiment of the invention will now be described with reference to FIGS. 1-3.

Figure 1:
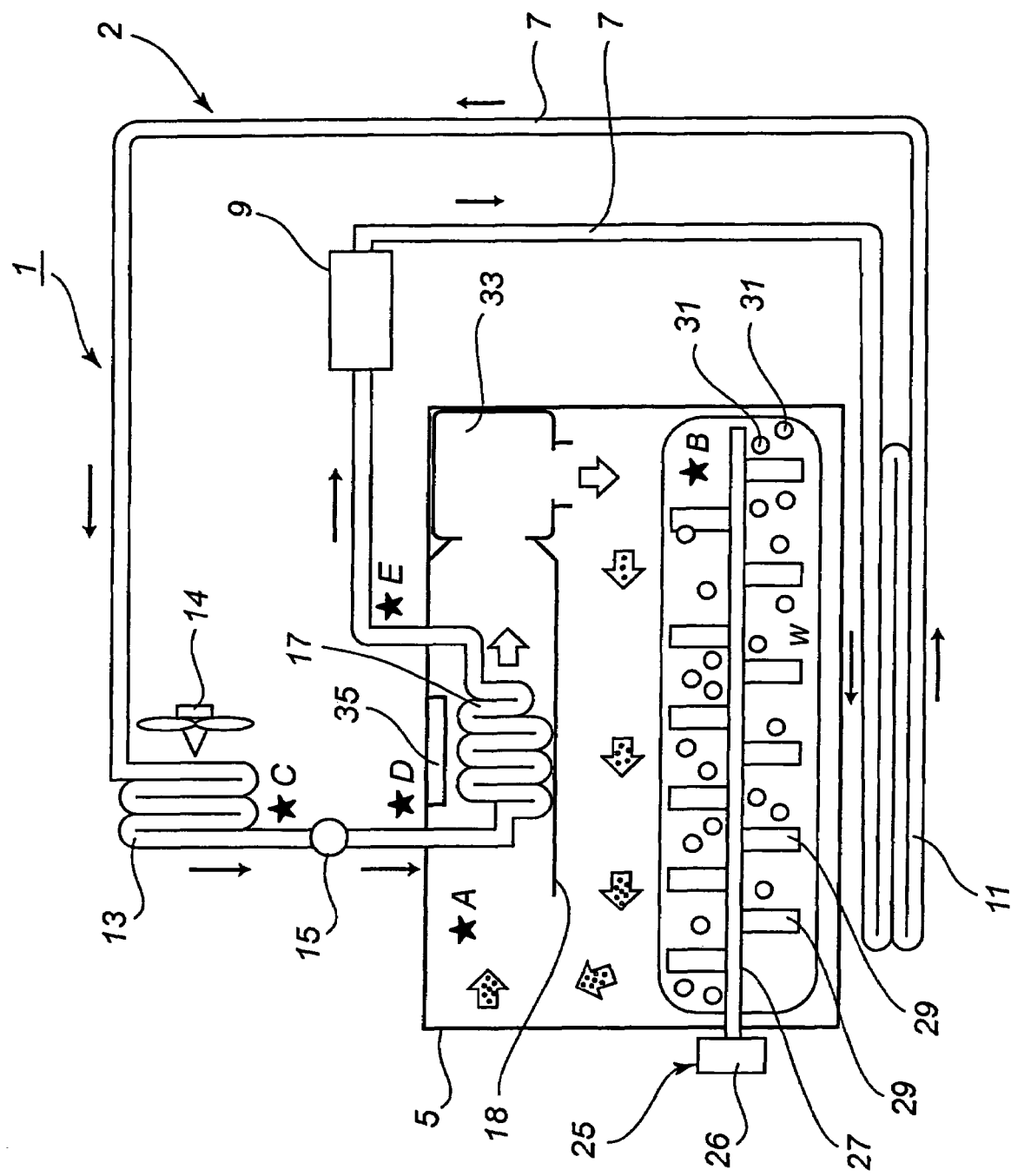
FIG. 1 is a diagrammatic view illustrating the drying system in accordance with a first embodiment of the invention.
Figure 2:
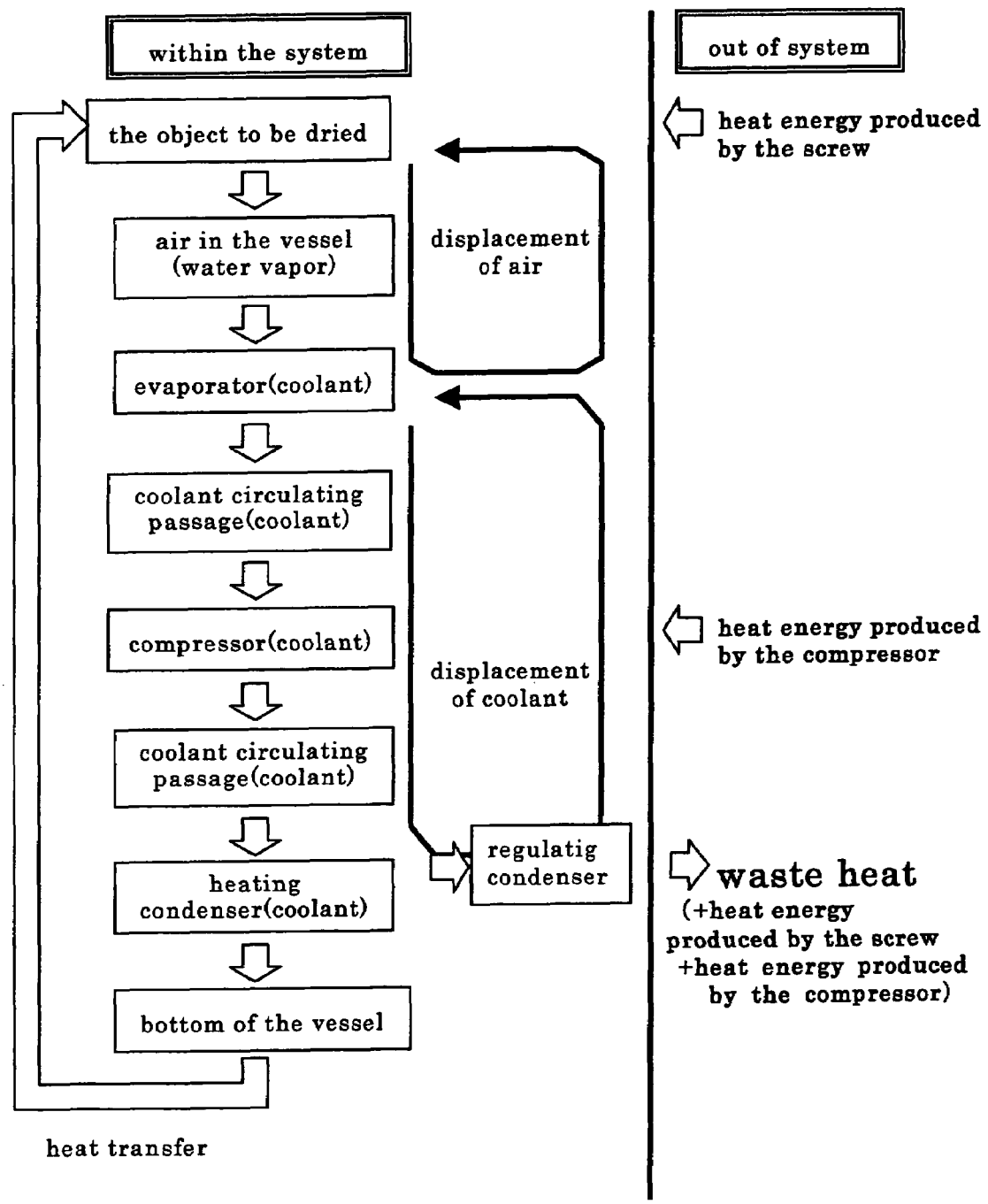
FIG. 2 is a flow diagram illustrating the cycle of heat transfer of the drying system of FIG. 1.
Figure 3:
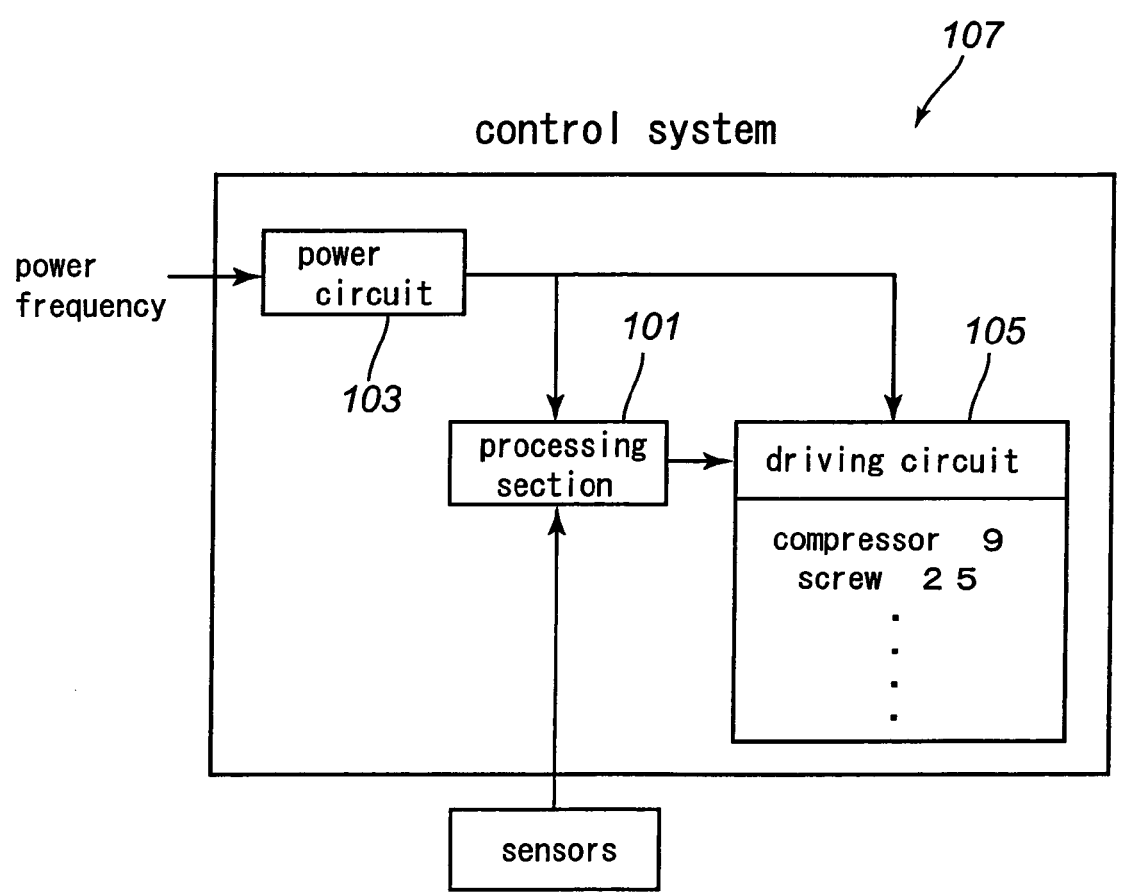
FIG. 3 is a block diagram illustrating a control system for controlling the drying system of FIG. 1.

FIG. 1 is a diagrammatic view illustrating the drying system in accordance with the first embodiment, FIG. 2 is a flow diagram illustrating the cycle of heat transfer, and FIG. 3 is a block diagram illustrating the system for controlling the drying system of the invention.

In this embodiment, an object (W) to be dried is tea leaves, which represent moist organic materials.

Essential components of the drying system 1 are compression refrigeration cycle section 2 and processing vessel 5. In this drying system 1, the cooling and heating operations are effected on direct modes, respectively.

At first, the arrangement and the operation of the compression refrigeration cycle section 2 are described in detail.

The section 2 is provided from the upstream side thereof with a compressor 9, a heating condenser 11, a regulating condenser 13, an expansion valve 15, and an evaporator 17 in this sequence. A coolant is circulated within the section through the flow passage 7.

Upon operating the system, the coolant of high temperature and high pressure is delivered from the compressor 9, and then flows through the flow passage 7 into the heating condenser 11. The coolant discharges condensation heat in the condenser 11. Thus, the object (W) is heated whereby water vapor is generated. The coolant is liquefied at the heating condenser 11 and delivered into the regulating condenser 13 and facilitated liquefaction further therein. The coolant is then delivered into the expansion valve 15 and decompressed therethrough to make low temperature and low pressure one. Subsequently, the coolant flows into the evaporator 17. The evaporator 17 is provided within a guide way 18. The guide way 18 is arranged to lead a moisture-laden air into the evaporator 17. After the moisture-laden air, or a high humidity air in the vessel 5 flows through the guide way 18, the evaporator 17 condenses the moisture in water vapor contained in the air. That is, when the moisture in the air condensates on the surface of the evaporator 17. The moisture in water liquid drops on the bottom of the guide way 18, and then delivered out from the system 1 through drain port (not shown). The coolant vaporized within the evaporator 17 is delivered back into the compressor 9.

The compressor 9 is of a type of variable capacity, so that the capacity of the compressor 9 can be enhanced to increase the flow rate of the coolant delivered into the heating condenser 11 to increase the amount of heat derived therefrom when the temperature of the object (W) is relatively low such as upon commencement of the drying system 1. Thus the efficiency of the system upon commencement can be improved.

The heating condenser 11 is made of a tube of a serpentine pattern of heat conductive material such as copper. The tube is provided on the outer surface of the bottom of the vessel 5 so as to contact directly therewith.

The regulating condenser 13 (including an air blower fan 14) is arranged outside of the vessel 5. The condenser 13 serves to facilitate liquefaction of the coolant under the effect of outside air temperature when it is difficult to sufficiently cool the coolant due to the increase in the flow rate of coolant and/or the rising of the temperature of the object (W). The liquefaction may be effected to provide the coolant of liquid phase to the expansion valve 15 to stabilize the circulation of the coolant. It is further advantageous to control the temperature of the heating condenser 11 by controlling the condensing pressure of the compression refrigeration cycle.

FIG. 2 is a flow diagram illustrating the cycle of heat transfer in the drying system 1. As can be seen therefrom, the heat transfer through the air within the vessel and that through the coolant are illustrated.

FIG. 3 is a block diagram illustrating the system for controlling the drying system of the invention.

The signals coming from a group of sensors are to be input, as shown in FIG. 3, to the processing section 101 (including CPU, memories, and I/O ports). The power circuit 103 is connected to the processing section 101 and the driving circuit 105 for the screw 25 etc. The processing section 101 is adapted to process the signals in accordance with the program stored in the memories to control the driving circuit 105 upon energized by the power circuit 103. The control system comprises the processing section 101, the power circuit 103, and the driving circuit 105.

The arrangement and the operation of the processing vessel 5 will now be described.

A screw 25 for stirring the object is disposed near the bottom of the vessel 5. The screw 25 includes a motor 26, a shaft 27 connected to the motor 26, and a plurality of blades 29 secured to the shaft 27.

The shaft 27 is arranged in parallel with the bottom of the vessel 5. The blades 29 are secured to the shaft 27 in such an angle that the blades 29 scoop from near the bottom of the vessel 5, the object (W), which has been heated and is likely to easily evaporate the moisture in water liquid, and the pulverizing members 31, upwardly. The leading edge of each blade 29 is formed of a soft resinous material and is designed to describe an orbit lapping with the surface of the bottom of the vessel 5.

The pulverizing members 31 include ceramic balls of high hardness. The pulverizing members 31 are charged within the vessel 5.

The pulverizing members 31 is adapted to be moved in random fashion under movement of the screw 25, since the pulverizing members 31 is not connected with the screw 25. The object (W) is pulverized down by the collision with the pulverizing members 31, thus increasing the surface area of thereof capable of being contacted with the moisture-removed air of low humidity to facilitate the discharge of the water vapor therefrom. Additionally, the pulverizing members 31 also serve to enhance thermal transfer, since they are formed of ceramic material of high coefficient of heat transfer.

A blower 33 serves as a circulator for circulating the air within the vessel 5. The blower 33 is arranged to blow downwardly the moisture-removed air from the evaporator 17. Thus, the air circulating circuit shown by the blanked arrows is formed upon operating the blower 33. In other words, the air within the vessel 15 is circulated between the surface of the object (W) and the evaporator 17. The flow rate of the moisture-laden air passing through the evaporator 17 can be adjusted by controlling the operation of the blower 33, i.e. the blower 33 also serves as a controller for controlling the capacity of air.

The air derived from the evaporator 17, or the moisture-removed air is of low humidity, which is short of saturation.

A shower 35 is provided above the evaporator 17. The shower 35 disperses water against the evaporator 17.

The larger the amount of evaporation, the lower the amount of condensate, vice versa, i.e. these are the restriction factors with each other. In other words, the capacity of the drying system 1 can be determined by either lower one.

In order to enhance the amount of evaporation, it is advantageous to increase the amount of evaporation for unit area and to enlarge the surface area to be contacted with the air of low humidity. The amount of evaporation for unit area can be increased by (1) reducing moisture, or water vapor amount in the air, (2) increasing the saturation vapor amount by rising the temperature of the air, and/or (3) increasing the vapor pressure of the object (W). The procedures (1) and (2) can be performed by re-heating the air. On the other hand, the procedures (1) and (3) can be performed by the method using the system of the invention. In accordance with the invention, the procedure (1) can be performed by rapidly changing the moisture-laden air to the moisture-removed air by means of the blower 33. The procedure (3) can also be performed in accordance with the invention by heating the object (W) and the pulverizing members 31 to increase the pressure of the water vapor within the object (W) and on the surface of the members 31.

Upon rotated the screw 25, the blades 29 are also rotated therewith to stir the object (W) and the pulverizing members 31. Thus, the object (W) placed on the surface of the bottom of the vessel 5 can be scooped out by means of the blades 29 and brought upwardly within the vessel 5, since the orbit described by the leading edge of the blade 29 is designed to be lapped with the surface of the bottom of the vessel 5. The heated object (W) is transferred upwardly to facilitate the contact with the moisture-removed air. On the contrary, another object (W) of relatively low temperature is supplied continuously onto the surface of the bottom of the vessel 5.

Heat transfer to another object (W) from the heating condenser 11 is rapidly performed because another object (W) has not yet been heated.

The heat energy of the coolant in the heating condenser 11 is transferred to the bottom of the vessel 5 and then transferred directly further into the object (W) without passing through an air layer. The heat energy is transferred from the surface of the bottom into the object (W) steadily, evenly, and rapidly since the screw 25 stirs sufficiently the object (W), and the pulverizing members 31 serves as a heat transfer.

Upon operated the screw 25 after the object (W) and the pulverizing members 31 are charged into the vessel 5, the object (W) is mashed by the random rumbling of the members 31 so that the moisture of the object (W) may exude to present on the surface or the vicinity of the material. This is especially useful for increasing the amount of evaporation from the object (W).

The pulverizing members 31 are also useful in forming voids between the objects (W). The exudates, obtained by mashing the object (W) may also be transferred on the surface of the members 31. Thus, the moisture of the object (W) is easily evaporated from the surface of the members 31 and incorporated into the moisture-removed air thereby the air is changed to the moisture-laden air within the vessel 5. In other words, the members 31 will also bring the effect which can be obtained by increasing the surface area of the object (W) to be contacted with the moisture-removed air.

Driving the screw 25 in relatively high speed will also bring such an advantage that chance for contacting the object (W) and the pulverizing members 31 with the moisture-removed air is enhanced. However, thus obtained advantage will be diminished when the moisture of the object (W) is substantially decreased and the object (W) is going to transform into powder. Incidentally, the screw 25 is controlled to reduce the number of rotation for preventing the powder from scattering around.

The moisture-removed air being short of saturation is blown on the object (W) in accordance with the circulation circuit of the air in the vessel.

Thus, the moisture-removed air goes on blowing onto the surface of the object (W) in according to the circulation passage, so as to achieve continuous evaporation therefrom.

The moisture of the object (W), already having sufficient heat amount, contacts with the moisture-removed air and evaporate. The evaporated moisture or water vapor holds evaporation heat therein as latent heat. When the system 1 is operated under the steady state, the relative humidity of the moisture-laden air is kept substantially 100% or so until the drying operation is progressed to reach the predetermined degree, provided that evaporation of the moisture in water liquid of the object (W) is facilitated through the mashing and the pulverizing effects of the screw 25 and the members 31.

The water vapor or the moisture-laden air is transferred to the evaporator 17 in accordance with the circulation passage of the air in the vessel 5, and then the latent heat is used to condensate the water vapor to water condensates. Thus, the water condensates are delivered through the discharge drain outside of the system 1. The moisture-removed, low humidity air is again blown on the object (W).

As can be seen From FIG. 1, small circles added on the blanked arrow designate the amount of water vapor. In this connection, the arrow designating the moisture-removed air just leaving from the evaporator 17 has no circles, whereas the following arrows have circles increasing their number in the flowing direction. In other words, the moisture amount of the air flowing over the object (W) increases along the flowing direction. Thus formed moisture-laden air is delivered into the evaporator 17, and the moisture is removed upon condensation from the moisture-laden air. That is, the moisture-laden air changes to a moisture-removed air.

The arrangement and the control operation of the detector or sensor system will now be described.

The sensor A is adapted to detect the humidity and the temperature of the moisture-laden air just before flowing into the evaporator 17. The air flow of the blower 33 or the flow rate of air passing through the evaporator 17 is adjusted to maximize the amount of condensate based on the relative humidity, the information on the temperature, and the absolute humidity obtained by processing the information from the sensor A. This is the most important function of the sensor A.

Since the cooling power is kept constant in the drying system 1, if the flow rate of air through the system is increased gradually, the total amount of condensates will also increase gradually to the peak, and then dropped rapidly. However, the larger the flow rate of air, the larger the amount of condensates, if the relative humidity of the air immediately before condensed is kept 100%. In other words, the amount of condensates depends on the flow rate of air i.e. the amount of condensates is reduced when the flow rate is too large or too small. In this connection, it is necessary to control the flow rate of air so as to maximize the amount of condensate in order to exhaust the capacity of the compression refrigeration cycle. The flow rate of air maximizing the amount of condensate depends on the conditions such as the temperature and/or the humidity of the moisture-laden air, after which will be immediately condensed. The flow rate of air maximizing the amount of condensates is determined by processing these conditions.

During the drying operation through which the object (W) is kept in relatively water rich condition, the relative humidity of the moisture-laden air is easily kept around 100%, even if the flow rate of air is high. Therefore, the flow rate determined by working the blower 33 is increased in view of maximizing the total amount of condensates. Then the moisture content of the object (W) is reduced as the drying process goes. This will lead to the reduction of the relative humidity of the moisture-laden air, if the flow rate is still high. In order to lower the dew point of the water vapor and sequentially proceed with the condensation, the flow rate of air in the vessel 5 is reduced gradually. In conclusion, the total amount of condensates is increased. Further, the final stage of the drying operation is performed in extremely low dew point. Thus, the resultant object (W) has high quality with almost no moisture content.

The revolution rate of the screw 25 is adapted to be controlled on the basis of the relative humidity and the temperature in the vessel obtained from the sensor A and the absolute humidity calculated by processing these information. When the value of the detected relative humidity is lower than the predetermined one, the revolution of the screw 25 is increased to facilitate evaporation of the moisture content. When the value of the detected relative humidity is further reduced under the predetermined lower limit value, the revolution rate of the screw 25 is rather reduced. This is because the object (W) is transformed into powder as the drying goes, and scattered around if the revolution rate of the screw 25 is still kept high, so that evaporation of the moisture is rather prevented. The final stage of the drying process dries the object (W) with a lot of time, since the process is performed in the capacity-reduced compressor 9. Even if it is intended to reduce the moisture content of the object (W) to an extremely low level, the drying system 1 can still be driven efficiently and economically by adjusting the capacity of the compressor.

Upon the object (W) is dried further and the absolute humidity of the air in the vessel reached the lower limit value defined in dependence on the property of the object material, operation of the screw 25 and the blower 33 in the vessel as well as the whole operation of the compression refrigeration cycle section 2 are stopped. Thus the end of the drying process can be determined automatically.

The sensor B is adapted to detect the temperature of the object (W). The temperature of the object (W) may be controlled to be the predetermined value by controlling the fan 14 of the regulating condenser 13 in accordance with the information from the sensor B to vary the amount of heat to be transferred from the heating condenser 11 to the object (W). In the first embodiment, the heating condenser 11 and the regulating condenser 13 are connected in series, so that the condensation temperature of the compression refrigeration cycle can be varied by controlling the fan 14 of the regulating condenser 13. The heat transferred from the heating condenser 11 to the object (W) can thus be varied.

In the drying system 1, when the operation of the heating condenser 11 is not controlled, the temperature of the object (W) increases higher and higher. Thus, the quality of the finished product can not be assured. When the temperature is too high, only the peripheral portion of the object (W) will be dried rapidly and solidified, and the internal portion thereof left as it is. In the worse case, the object (W) will scorched or charred. Although thus produced object (W) containing moisture inside of the hard scorched surface thereof has a completely dried appearance, it will get moldy and rotted in due course. In other words, thus produced object (W) does not have a long term-preferable quality. Further, if the temperature of the object (W) is beyond that changing its property, the quality of the object (W) is also spoiled.

In this connection, it is necessary to control the upper limit of the temperature in accordance with the raw material properties of the object (W) for producing of high quality.

The sensor C detects the temperature of the coolant immediately before flowing into the expansion valve 15. The revolution rate of the fan 14 of the regulating condenser 13 is adjusted under PID control on the basis of the temperature information obtained from the sensor C, so that the excess amount of heat energy is delivered out of the system 1 to control the condensation temperature of the compression refrigeration cycle to a constant level.

The standard temperature of the coolant before the expansion valve is about 45° C. (for R 22) or 38° C. (for R 407).

During the normal drying operation, the amount of moisture, which has been evaporated and removed from the object (W), and the amount of condensates generated in the evaporator 17, upon condensation of the evaporated moisture, or water vapor are balanced, and the amount of latent heat transferred, upon the moisture's condensation, into the coolant is balanced with the amount of heat energy used in evaporation of moisture contained in the object (W) and the pulverizing members 31. Further, although the heat energy generated by the compressor 9 and the screw 25 is incorporated in the system, the heat energy is discharged out by the regulating condenser 13.

Upon commencement of the drying system 1, the temperature of the object (W) is relatively low, so that the condensation of the coolant is enhanced, the temperature of the heating condenser is decreased, and the amount of heat energy supplied to the object (W) is decreased. There is no problem in the operation of the compression refrigeration cycle. However, in such a case, it is preferable to increase the revolution rate of the compressor 9 to increase the flow rate of the coolant. If the compressor 9 is adjusted so, the temperature of the heating condenser is also increased so that the temperature rising is improved. Although this can also be performed by controlling the revolution rate of the fan 14 of the regulating condenser 13 to be zero, it is more effective to increase the revolution rate of the compressor 9.

The heat energy generated by the screw or so can also contribute the temperature rising speed of the object (W).

The sensor D detects the temperature of the coolant at the inflow side of the evaporator 17, and the sensor E detects the temperature of the coolant at the outflow side of the evaporator 17. When the temperature difference between those measured at the sensor E and D is smaller than the predetermined value, the evaporator 17 is regarded to be in the malfunction condition due to icing etc., so that the defrosting operation is effected. The defrosting operation is performed by stopping the operation of the compressor 9 and/or spraying water from the shower 35 onto the evaporator 17 and/or the full power operation of the blower.

Figure 4:
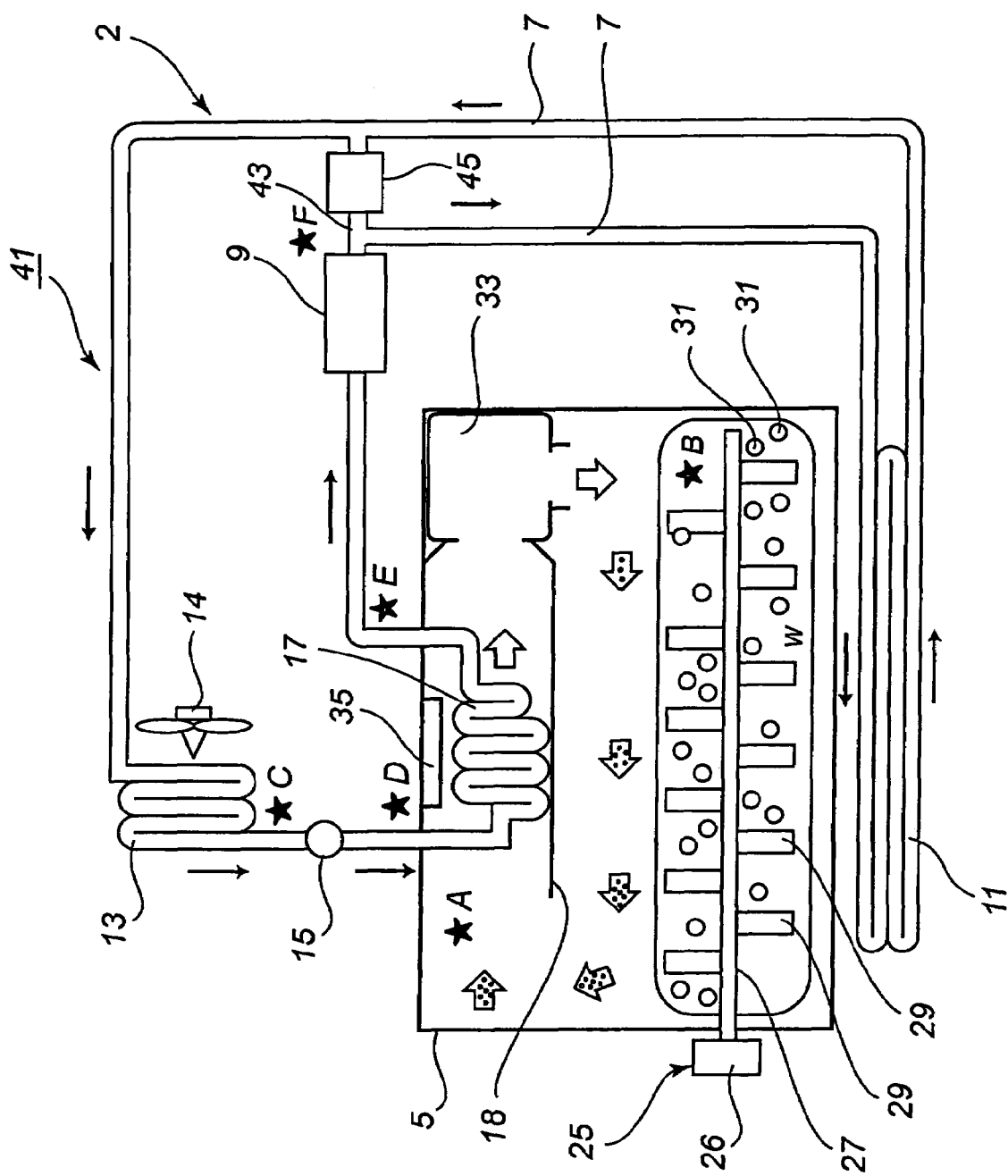
FIG. 4 is a diagrammatic view generally illustrating the drying system in accordance with a second embodiment of the invention.

The drying system 41 in accordance with the second embodiment will now be described with reference to FIG. 4. This figure is a diagrammatic view generally illustrating the drying system 41. The structural components of the drying system 41 illustrated in FIG. 4 are designated by the same reference numeral as those used in FIG. 1, provided that those corresponding components are substantially identical with each other. In this connection, the description is omitted on the corresponding components.

The drying system 41 is provided with the first flow passage (coolant circulating passage 7) for delivering coolant from the compressor 9 to the heating condenser 11, and the second flow passage (by-pass passage) 43 in parallel with the first one for delivering coolant directly into the regulating condenser 13. The second flow passage is provided with a flow control valve 45. When it is almost unnecessary to increase the temperature of the object (W), the divergence of the flow control valve 45 is increased to deliver the majority of the coolant from the compressor 9 to the regulating condenser 13, so that the amount of heat energy to be provided by the heating condenser 11 is reduced to suppress the temperature rise of the object (W).

The sensor F detects the temperature of the coolant delivered from the compressor 9. The divergence of the flow control valve 45 may be controlled on the basis of the information on the temperature obtained from the sensor F.

The drying system 51 of the third embodiment will now be described with reference to FIG. 5.

Figure 5:
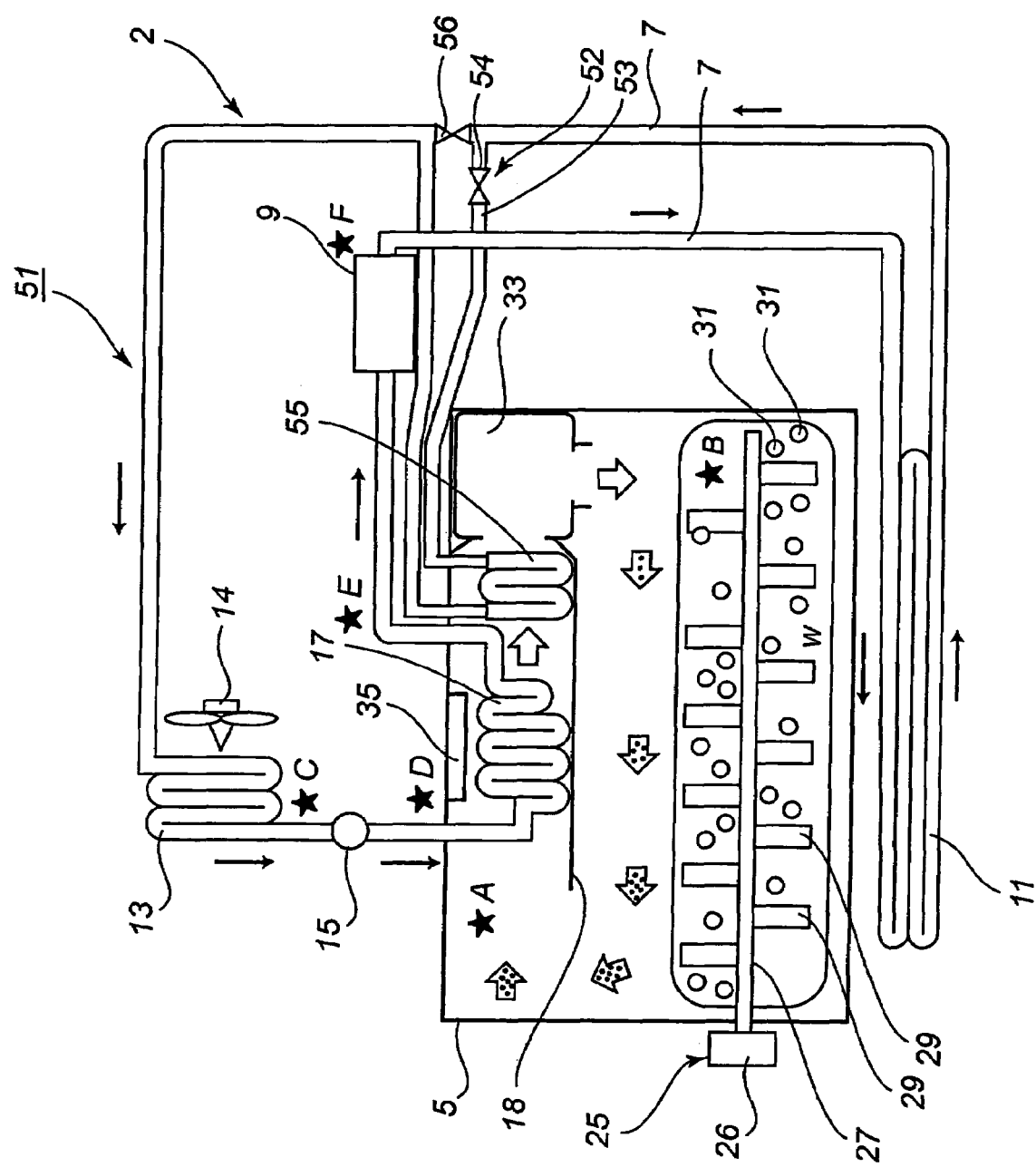
FIG. 5 is a diagrammatic view generally illustrating the drying system in accordance with a third embodiment of the invention.

FIG. 5 is a diagrammatic view generally illustrating the drying system 51. The structural components of the drying system 51 illustrated in FIG. 5 are designated by the same reference numeral as those used in FIG. 1, provided that those corresponding components are substantially identical with each other. In this connection, the description is omitted on the corresponding components.

The principal aspect of the drying system 51 is a reheating section 52. The coolant of high temperature and high pressure flows from the compressor 9 through the flow passage 7 and into the heating condenser 11 to provide heat energy to the object (W) through liquefying the coolant. The reheating section 52 connected in series with the heating condenser 11 includes a reheating element 55 for heating air immediately after passing through the evaporator 17. The amount of heat energy to be supplied by the reheating element 55 is controlled by the flow control valves 54 and 56 provided on a coolant supplying passage 53. The inflow conduit from the compressor 9 is provided with the temperature sensor F.

The reheating element 55 is a fin plate heat exchanger served as a condenser. The method for using this heat exchanger will now be described. At first, the flow control valve 54 is closed completely, whereas the flow control valves 56 is opened. The object (W) in the vessel 5 includes very large amount of moisture at the beginning of the drying process. Upon operating the compression refrigeration cycle, the water liquid is heated by the heating condenser 11 and large amount of water vapor is generated within the vessel 5. The heating temperature of the heating condenser 11 is controlled by adjusting the amount of heat energy delivered out of the system through controlling the operation of the fan 14 of the regulating condenser 13.

When it is intended to heat the object (W) rapidly, the fan 14 of the regulating condenser 13 is stopped to provide whole heat energy generated through the operation of the compression refrigeration cycle from the heating condenser 11 to the object (W) within the vessel 5. The object (W) is dried by cooling the air in the vessel 5 including large amount of water vapor at the evaporator 17 to make water liquid. As described above, the system is operated in high efficiency, since whole heat energy of the system is available. Thus the energy efficiency designated by COP will reach to 7.

When the object (W) is sufficiently dried and the emission of moisture is decreased, the humidity of the air in the vessel 5 is also reduced. Thus the amount of moisture removed from the moisture-laden air at the evaporator 17 is reduced and the lower pressure of the coolant flowing into the compressor 9 is dropped.

This reduction of the lower pressure will bring the lowering of the temperature of the coolant from the compressor 9. The timing of the lowering of the temperature is detected by the information on the temperature from the sensor F.

In this situation, the temperature within the vessel 5 is not raised even by providing the heat energy through the heating condenser 11. Then the flow control valve 54 is opened to deliver coolant into the reheating element 55 to rise the temperature of the outflow side of the evaporator 17. Thus the temperature of the vessel 5 is also increased to recover the lower pressure of the compression refrigeration cycle and the performance of the evaporator 17. In this connection, it is expected that the dryness of the object (W) can also be increased further.

In the above mentioned third embodiment, the relative humidity sensor A is not necessary be provided, since whether the reheating section 52 is to be operated or not can be determined on the control signal from the sensor F. This is because the operating condition of the compression refrigeration cycle can be detected on the basis of the relative humidity within the vessel 5.

The fourth embodiment of the present invention will now be described with reference to FIG. 6.

Figure 6:
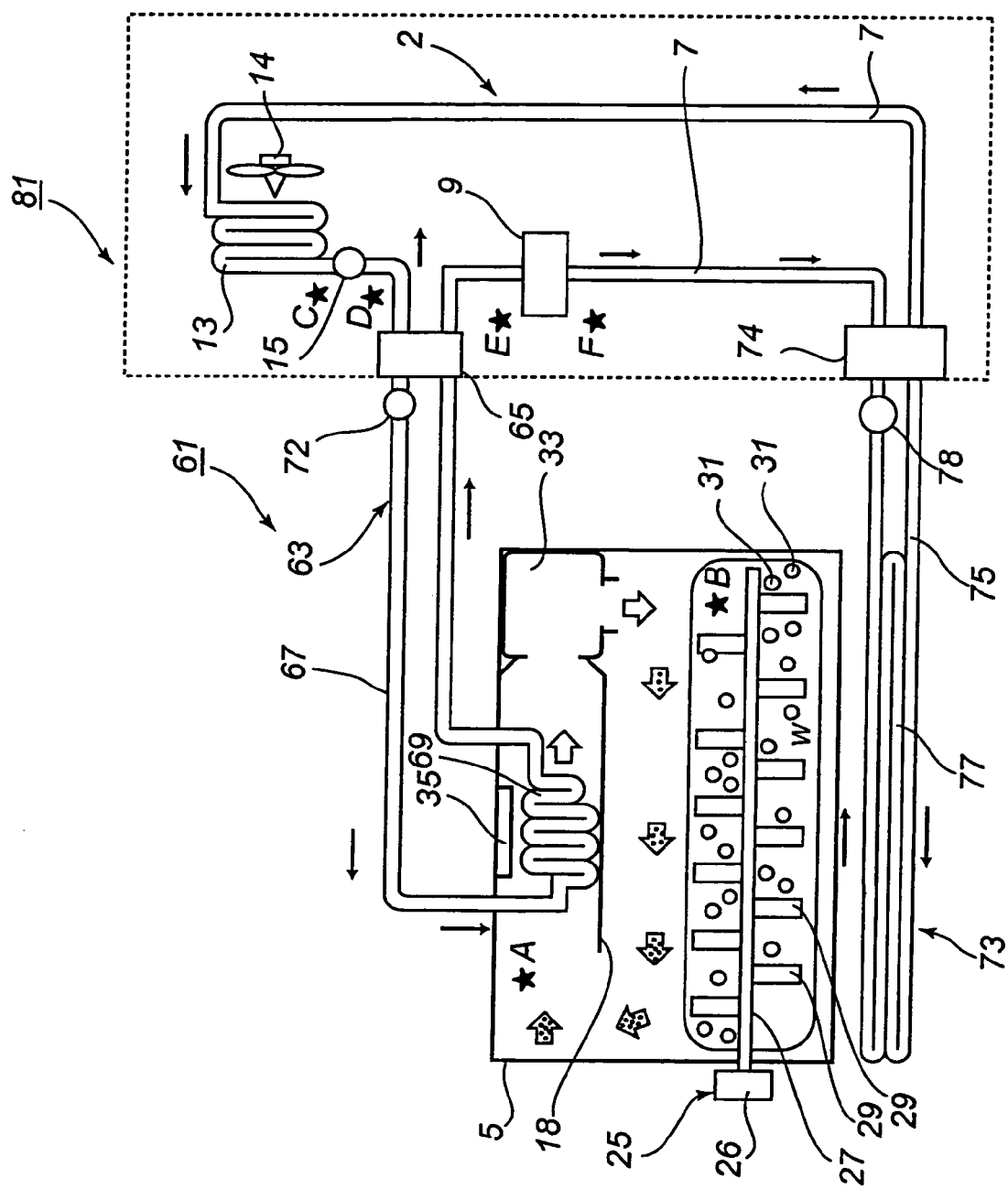
FIG. 6 is a diagrammatic view generally illustrating the drying system in accordance with a fourth embodiment of the invention.

FIG. 6 is a diagrammatic view generally illustrating the drying system 61. The structural components of the drying system 61 illustrated in FIG. 6 are designated by the same reference numeral as those used in FIG. 1, provided that those corresponding components are substantially identical with each other. In this connection, the description is omitted on the corresponding.

In this drying system, the indirect cooling and heating mode is adopted.

The first brine circulating circuit 67 includes a refrigerator 69 and a circulating pump 72. The refrigerator 69 is provided within the vessel 5. The first brine circulating circuit 67 is connected to the evaporator 65 of the compression refrigeration cycle section so as to be able to exchange the heat energy. Thus the indirect refrigerating section 63 is formed. The heat exchanger for the first brine as well as the coolant is preferably of the serviceable compact plate type. Upon being driven the circulating pump 72, the first brine, which has been cooled at the evaporator 65 flows into the refrigerator 69 for cooling and dehumidifying the moisture-laden air which will flow through the guide way 18.

The second brine circulating circuit 75 includes a heater 77 and circulating pump 78. The heater 77 is provided on the outer surface of the bottom of the vessel 5. The second brine circulating circuit 75 is connected to the heating condenser 74 of the compression refrigeration cycle section so as to be able to exchange the heat energy. Thus the indirect refrigerating section 73 is formed. The heat exchanger for the second brine as well as the coolant is preferably of the serviceable compact plate type as with the evaporator 65. Upon being driven the circulating pump 78, the second brine, which has been heated at the heating condenser 74, flows into the heater 77 to increase the temperature of the object (W) to change the moisture from water liquid to water vapor form.

The first and second brine circuits are independent of each other, so that the first and second brines may be the same or the different materials. The brine utilized herein includes warm water and cold water.

The indirect refrigerating section 63 and the indirect heating section 73 forms a processing section together with the vessel 5 and the equipment disposed within the vessel 5. The compression refrigeration cycle section 81 including the compressor 9, the evaporator 65, the heating condenser 74, and the expansion valve 15 connected each other through the coolant circulating passage is detached with the first and second brine circulating circuits 67 and 75.

The control unit 107 is provided only on the compression refrigeration cycle section 81.

Following advantages can be obtained by detachably connecting the processing section to the compression refrigeration cycle section 81.

(1) The manufacture and the maintenance of these sections can be effected separately.

When the evaporator 65 is disposed within the vessel, it is difficult to make maintenance thereon, in spite of the corrosive property thereof. However, such disadvantage is avoided in this arrangement;

(2) The compression refrigeration cycle section 81 is fitted to apparatus of various designs by standardizing the connecting portions (the evaporator 65 and the heating condenser 74). Thus, the utility of the compression refrigeration cycle section 81 can be enhanced and the cost for manufacturing the same can be reduced.

(3) The driving circuit 105 is controlled on the basis of the information detected in the compression refrigeration cycle section 81 so that the confirmation of the operation and the maintenance of the drying system 61 is made easily.

The fifth embodiment of the present invention will now be described with reference to FIG. 7.

Figure 7:
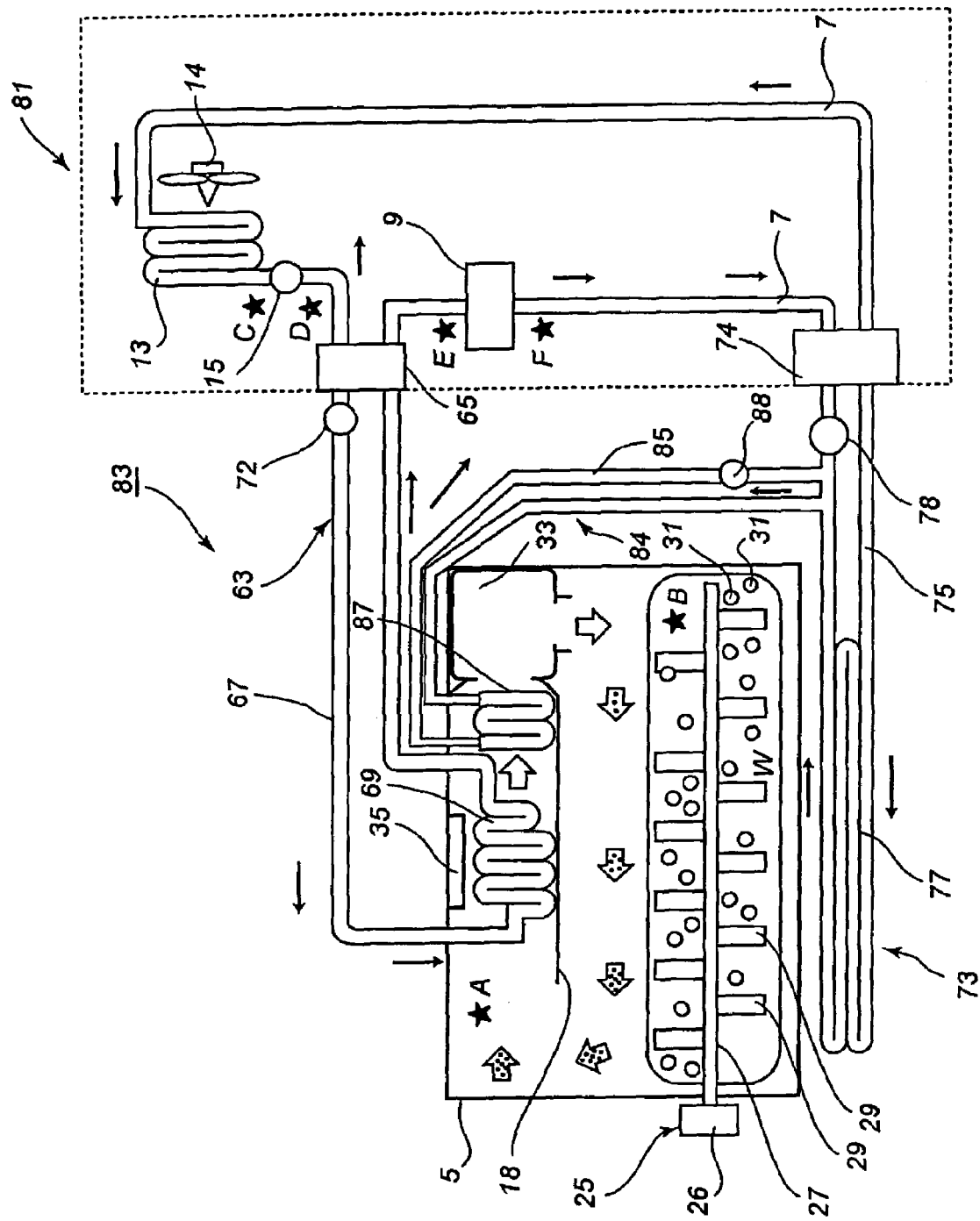
FIG. 7 is a diagrammatic view generally illustrating the drying system in accordance with a fifth embodiment of the invention.

FIG. 7 is a diagrammatic view generally illustrating the drying system 83. The structural components of the drying system 83 illustrated in FIG. 7 are designated by the same reference numeral as those used in FIG. 6, provided that those corresponding components are substantially identical with each other. In this connection, the description is omitted on the corresponding components.

In this drying system 83, the reheating section 84 is provided.

The reference numeral 85 is added to a branch passage. The passage 85 is connected at both ends thereof to the second brine circulating circuit 75 downstream of the heater 77. The reheating element 87 is disposed within the vessel 5. The passage 85 is also provided with a circulating pump 88 for forcing the brine into the reheating element 87. In such an arrangement, the system increases the amount of water to be removed from the object (W), as with the system of the third embodiment. In this connection, the dryness of the object (W) is expectedly increased. The compression refrigeration cycle section 81 has an arrangement which can be detached from the drying system 83 as with the fourth embodiment shown in FIG. 6, so that the above mentioned advantages (1), (2), and (3) are also obtained in this embodiment.

The sixth embodiment of the present invention will now be described with reference to FIG. 8.

Figure 8:
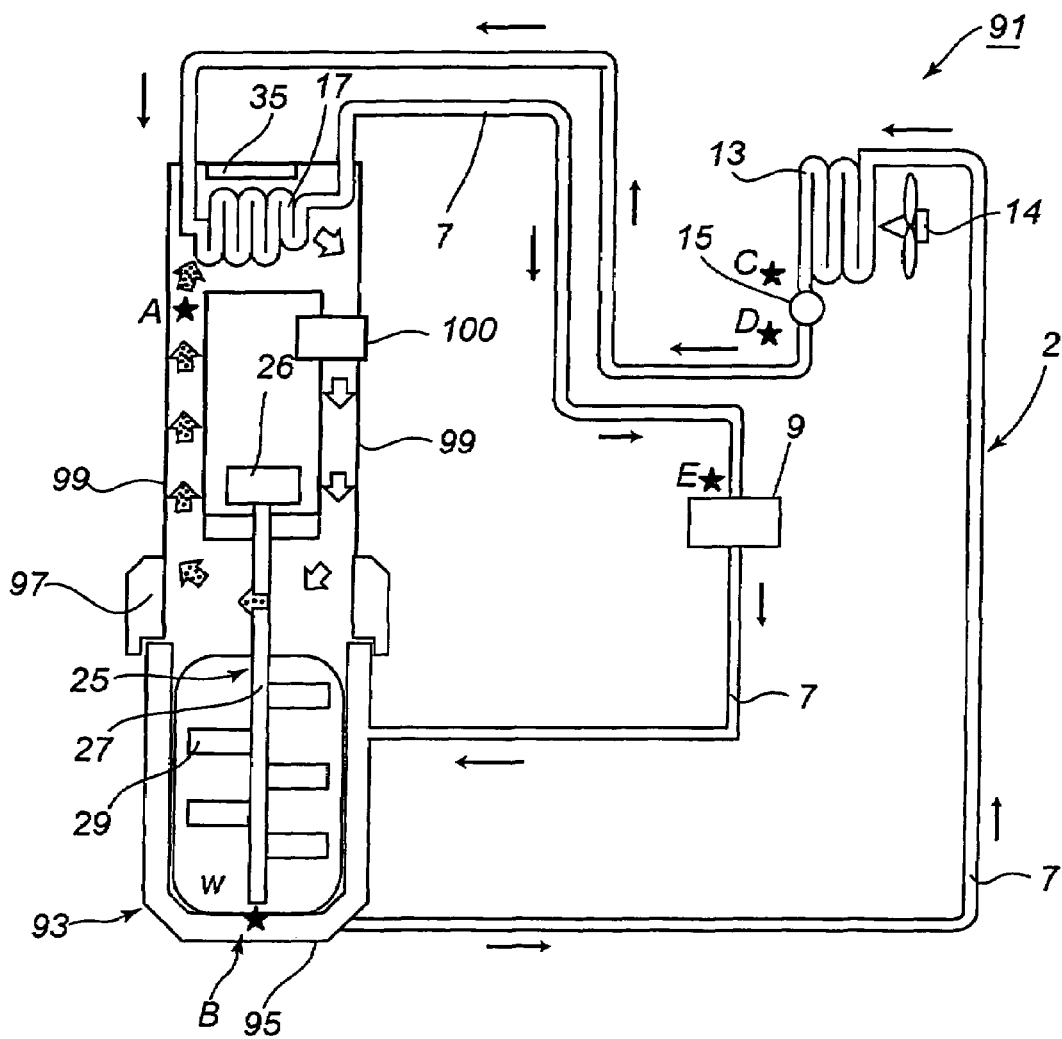
FIG. 8 is a diagrammatic view generally illustrating the drying system in accordance with a sixth embodiment of the invention.

FIG. 8 is a diagrammatic view generally illustrating the drying system 91. The structural components of the drying system 91 illustrated in FIG. 8 are designated by the same reference numeral as those used in FIG. 1, provided that those corresponding components are substantially identical with each other. In this connection, the description is omitted on the corresponding components.

In the drying system 91, the wall 95 of the vessel body 93 is of hollow structure made of the same material as that employed in the heating condenser 11. The vessel body 93 is adapted to be closed by lid 97. The reference numeral 99 is added to the flow passages. The intermediate portion of the passage extends laterally, and both side portions extend downwardly to the lid 97. The evaporator 17 is provided within the passage.

Although the screw 25 is of vertical type, the structure thereof is substantially the same as that used in the drying system 1.

The reference numeral 100 is added to the blower for circulating the air in the direction designated by blanked arrows. No pulverizing materials 31 are charged into the vessel body 93.

The object (W) is heated by coolant delivered into the wall 95 of the vessel body 93 from the compressor 9. The coolant leaving the wall 95 is delivered into regulating condenser 13, and decompressed by means of expansion valve 15, then flows into the evaporator 17.

In this drying system 91, the area in which the moisture-laden air is produced (within the vessel body 93) and the area in which the moisture-removed air is generated (near the evaporator 17) are separated from each other by the flow passages 99, so that the transformation from the moisture-laden air to the moisture-removed air vice versa are done efficiently.

The seventh embodiment of the present invention will now be described with reference to FIG. 9.

Figure 9:
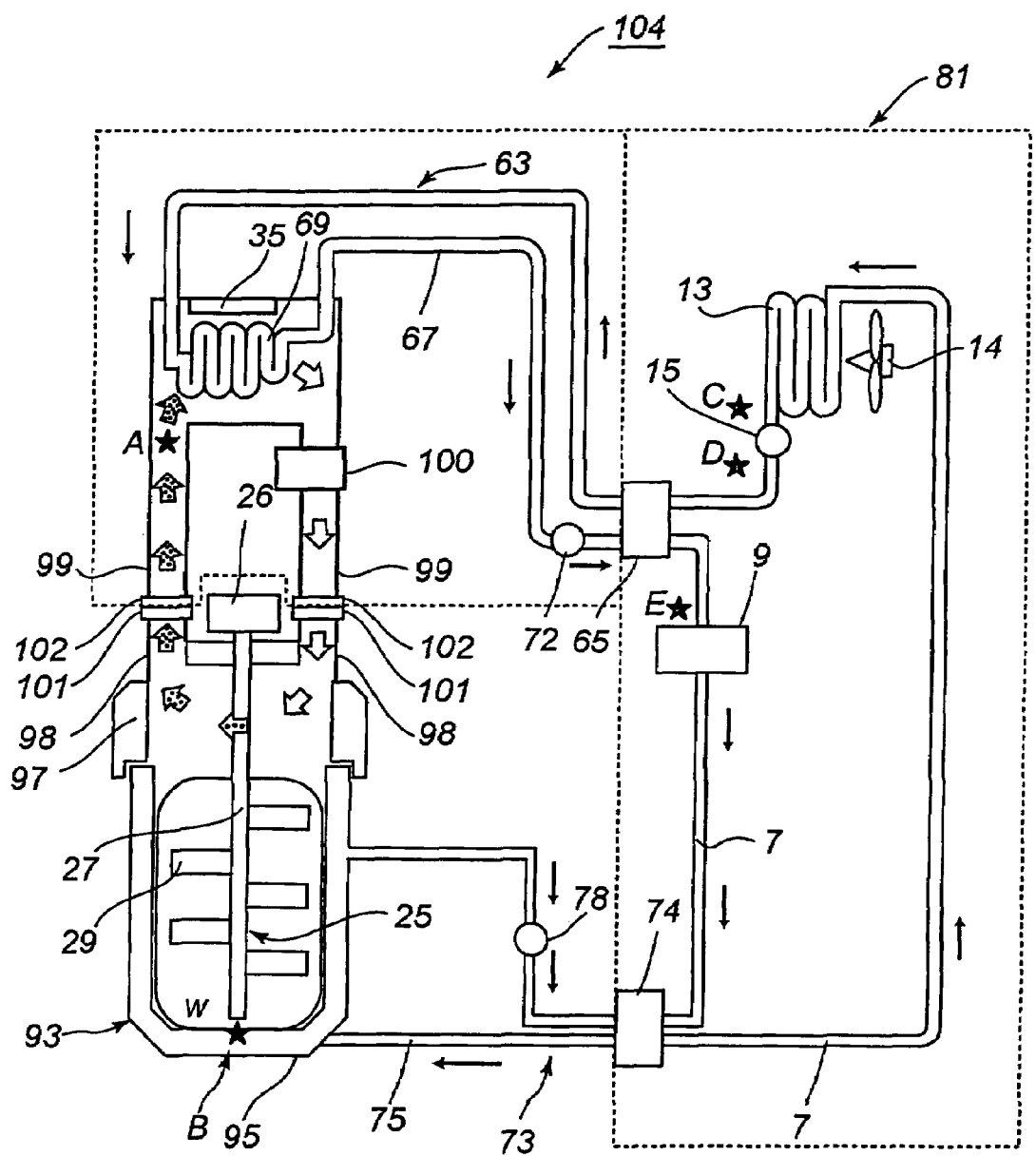
FIG. 9 is a diagrammatic view generally illustrating the drying system in accordance with a seventh embodiment of the invention.

FIG. 9 is a diagrammatic view generally illustrating the drying system 104 obtained by retrofitting the drying system 91 (FIG. 8) to adopt the indirect cooling and/or heating system of the drying system 61 (FIG. 6). The structural components of the drying system 104 illustrated in FIG. 9 are designated by the same reference numeral as those used in FIGS. 8 and 6, provided that those corresponding components are substantially identical with each other. In this connection, the description is omitted on the corresponding components.

A pair of air-flow passages is connected to the lid 97. One end of each passage is connected to the lid, and the other end of the passage is provided with a flange 101. These flanges are adapted to be connected to the flanges 102 provided at the both ends of the flow passage 99. When these flanges 101 and 102 are connected, the flow passage of the system is defined.

As can be seen from the above, the air flow passages 98 and 99 can be detached from each other, so that the vessel body 93 is separately assembled from the main structure of the system including the compression refrigeration cycle section 81, the air flow passage 99, and the refrigerator 69.

The eighth embodiment of the present invention will now be described with reference to FIG. 10.

Figure 10:
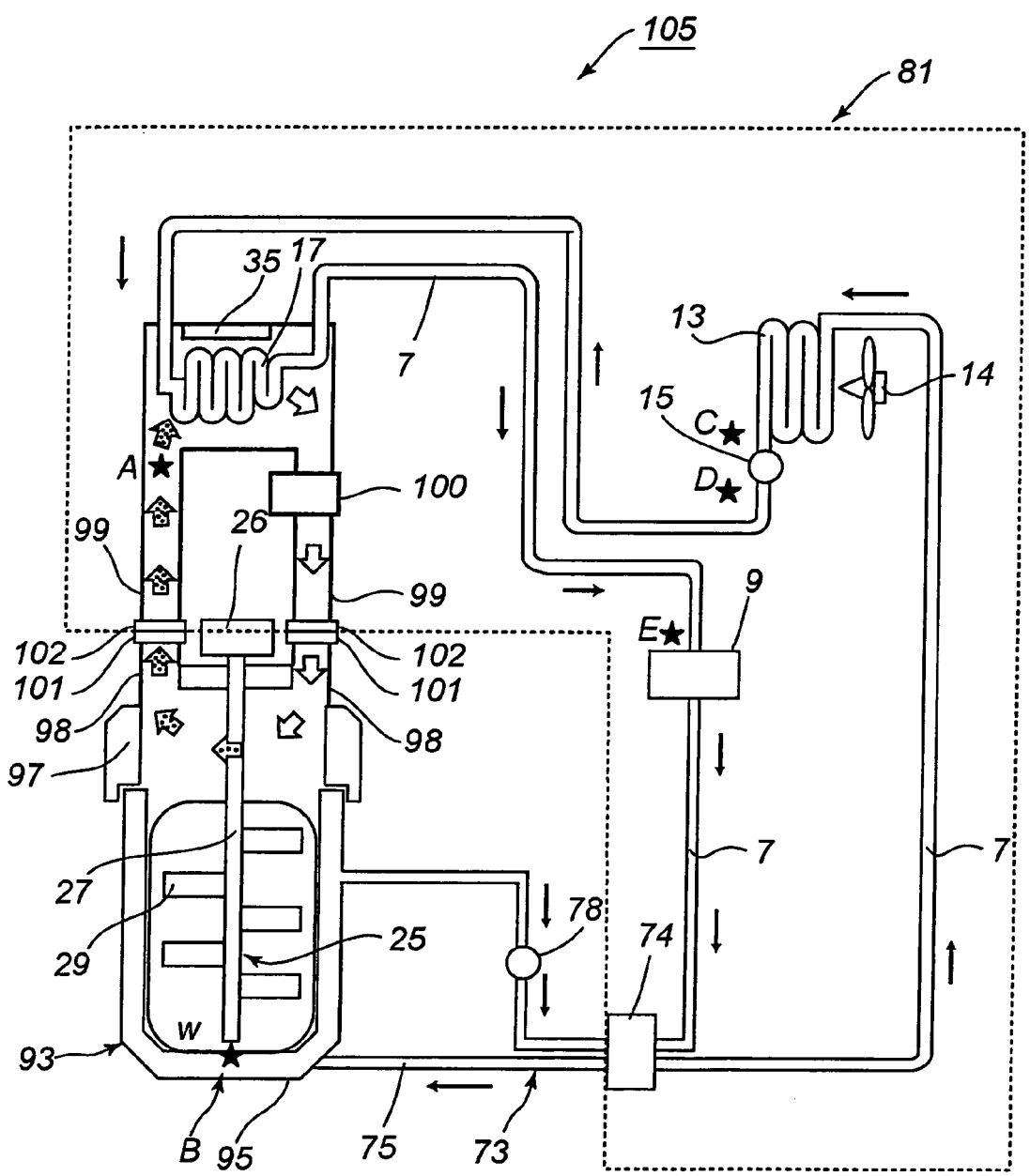
FIG. 10 is a diagrammatic view generally illustrating the drying system in accordance with an eighth embodiment of the invention.

FIG. 10 is a diagrammatic view generally illustrating the drying system 105 obtained by retrofitting the drying system 104 (FIG. 9) to adopt the direct cooling system of the drying system 91 (FIG. 8). The structural components of the drying system 105 illustrated in FIG. 10 are designated by the same reference numeral as those used in FIGS. 9 and 8, provided that those corresponding components are substantially identical with each other. In this connection, the description is omitted on the corresponding components.

While particular embodiments of the present invention have been illustrated and described, it should be obvious to those skilled in the art that various changes and modifications can be made without departing from the spirit and scope of the invention.

The compressor may for example be of a type of fixed displacement. In such a case, the capacity of the compressor may be adjusted by the intermittent (on/off) operation. This is suitable for the relatively smaller vessel, or for the case in which the final water content of the object is not relatively low.

The flow control valve may be an electromagnetic valve of on/off type. In such a case, the amount of heat energy can be adjusted by the intermittent (on/off) operation thereof.

The coefficient of heat transfer of the pulverizing assisting materials 31 may preferably be as high as possible. The examples of such material include metal or ceramics. Wooden materials are not preferable. Bamboo is better than the wooden materials.

It is a matter of course that the object (W) is not limited to organic materials.

The drying system of the present invention can be used under vacuum. In such a case, the vessel is designed to withstand the vacuum within the vessel. The system operates by pumps or blowers of relatively low pressure or ejector. Provided that the vacuum source is connected to the drain port to deliver the condensed water out of the system, the vacuum source must be selected to be able to handle the water without any problem.

The design of the drying system of the second embodiment can be changed to control the flow rate of the coolant delivered into the reheating element by means of the electromagnetic valve of on/off type. Further, the reheating element for heating the air in the vessel can be a radiator of on/off type.

INDUSTRIAL APPLICABILITY

In accordance with the drying system of the invention, the amount of energy to be consumed can be reduced substantially. In other words, the drying system of the invention is good for the natural environment and also is economically advantageous.

In the arrangement in which the compression refrigeration cycle section including a control unit can be detached from the vessel, the one refrigeration cycle section can advantageously be used in the variety of vessels. Thus the mass production of the compression refrigeration cycle section can be performed.

What is claimed is:

1. A closed drying system, comprising:
    a vessel that includes a moisture-containing object and an air circulator; and
    a compression refrigeration cycle section that includes:
        a compressor;
        a heating condenser that supplies heat energy to the object through a bottom of the vessel to generate moisture-laden air, which contains moisture in water vapor removed from the object, by evaporation of the moisture of the object;
        a regulating condenser that adjustably exhausts waste heat out of the system;
        an evaporator that is located inside the vessel and removes the water vapor from the moisture-laden air by refrigeration;
        an expansion valve connected after a circulating passage that delivers coolant from the compressor through the heating condenser to the regulating condenser; and
    a sensor that detects a temperature of coolant immediately before the expansion valve, from which temperature information the regulating condenser keeps a coolant temperature before the expansion valve at a constant level,
    wherein the air circulator circulates air between the object and the evaporator within the vessel whereby moisture-removed air with latent heat removed will contact with the object.

2. The closed drying system according to claim 1, further comprising;
    a detector that detects humidity and temperature of the moisture-laden air immediately before flowing over the evaporator, and
    a flow-rate controller that controls the flow-rate of the moisture-laden air flowing over the evaporator so as to maximize an amount of water to be condensed on the basis of information obtained by the detector on the humidity and the temperature.

3. The closed drying system according to claim 1, further comprising;
    a second coolant supplying passage that supplies the coolant directly to the regulating condenser, the second coolant supplying passage being arranged in parallel with the coolant supplying passage that supplies the coolant from the compressor to the heating condenser,
    a flow control valve provided in the second coolant supplying passage, and
    a sensor that detects a temperature of the coolant flowing out from the compressor, whereby the divergence of a flow control valve is controlled based on the temperature information from the sensor,
    wherein the expansion valve is disposed just downstream of the regulating condenser.

4. The closed drying system according to claim 1, further comprising;
    a heat-amount controller that controls an amount of heat energy provided by the heating condenser by controlling revolution of the compressor to vary an amount of the coolant to be delivered to the heating condenser.

5. The closed drying system according to claim 1, further comprising;
    a stirrer provided within the vessel that stirs the object.

6. The closed drying system according to claim 1, further comprising;
    a stirrer that stirs, and
    a pulverizer that pulverizes the object, both being provided within the vessel.

7. The closed drying system according to claim 1, wherein the object to be charged within the vessel includes a water-containing organic material.

8. The closed drying system accordingly claim 1, further comprising;
- a reheater connected directly through the coolant circulating passage to the heating condenser and that reheats the air within the vessel,
- a detector that detects a temperature of the coolant within a conduit from the compressor, and
- a reheat-amount controller that controls an amount of heat energy provided by the reheater on the basis of the temperature detected by the detector.

9. The closed drying system according to claim 1, wherein cooling is effected either through direct cooling mode by flowing the coolant decompressed by the expansion valve into the evaporator, or through indirect refrigeration mode by circulating a first brine between the evaporator and a cooling element provided within the vessel and connected heat exchangeably to the evaporator, and a heating is effected either through direct heating mode by flowing the coolant pressurized by the compressor to the heating condenser provided under the bottom of the vessel to heat the object within the vessel or through indirect heating mode by circulating a second brine between the heating condenser and a heater connected heat exchangeably to the heating condenser and provided under the vessel to heat the object within the vessel.

10. The closed drying system according to claim 9, wherein the indirect cooling mode and the indirect heating mode are adopted to make it possible to separate a compression refrigeration cycle section of the closed drying system from a processing section including the vessel.

11. The processing section included in the closed drying system according to claim 10.

12. The closed drying system according to claim 9, wherein
- the direct or indirect cooling mode and the indirect heating mode are adopted,
- the vessel includes a vessel body and an air-flow passage both ends of which are separately connected with the vessel body, having the evaporator or the cooling element accommodated therein, and
- the compression refrigeration cycle section and the air-flow passage are assembled separately with the processing section except for the air-flow passage to compose the closed drying system.

13. The processing section included in the closed drying system according to claim 12.

14. The closed drying system according to claim 1, wherein the coolant in the compression refrigeration cycle section is separate from air circulated in the vessel by the air circulator.

* * * * *